(12) United States Patent
Falk

(10) Patent No.: US 12,460,684 B2
(45) Date of Patent: Nov. 4, 2025

(54) CLUTCH ACTUATION DEVICE

(71) Applicant: Schaeffler Technologies AG & Co. KG, Herzogenaurach (DE)

(72) Inventor: Manuel Falk, Baden Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/856,375

(22) PCT Filed: Mar. 13, 2023

(86) PCT No.: PCT/DE2023/100186
§ 371 (c)(1),
(2) Date: Oct. 11, 2024

(87) PCT Pub. No.: WO2023/198239
PCT Pub. Date: Oct. 19, 2023

(65) Prior Publication Data
US 2025/0188997 A1    Jun. 12, 2025

(30) Foreign Application Priority Data
Apr. 12, 2022 (DE) ............... 10 2022 108 835.9

(51) Int. Cl.
*F16D 23/14* (2006.01)
(52) U.S. Cl.
CPC .................. *F16D 23/14* (2013.01)
(58) Field of Classification Search
CPC ................ F16D 13/70; F16D 23/14
See application file for complete search history.

(56) References Cited

U.S. PATENT DOCUMENTS

| | | | | |
|---|---|---|---|---|
| 4,119,187 A | * | 10/1978 | Ernst | F16D 23/14 192/110 B |
| 4,579,203 A | * | 4/1986 | Link | F16D 13/755 192/111.1 |
| 4,854,436 A | * | 8/1989 | Lassiaz | F16D 23/14 192/110 B |
| 5,104,240 A | * | 4/1992 | Okamoto | F16D 23/146 384/510 |
| 6,216,840 B1 | * | 4/2001 | Perseim | F16D 23/148 192/99 S |
| 7,654,376 B2 | | 2/2010 | Liu | |

FOREIGN PATENT DOCUMENTS

| | | | |
|---|---|---|---|
| DE | 2949194 A1 | 6/1980 | |
| DE | 102014225137 B3 * | 1/2016 | F16D 13/70 |
| EP | 1900953 A1 | 3/2008 | |
| WO | 2023110004 A1 | 6/2023 | |

* cited by examiner

*Primary Examiner* — Stacey A Fluhart
(74) *Attorney, Agent, or Firm* — Kevin L. Parks

(57) ABSTRACT

A clutch actuation device includes a sliding sleeve and an actuation bell for axially displacing the sliding sleeve. The sliding sleeve is axially displaceable for engaging and disengaging a clutch. The actuating bell has a main body and an elastic spring element. The main body is arranged for transmitting a first axial force to the sliding sleeve in a first axial direction. The elastic spring element is arranged for transmitting a second axial force to the sliding sleeve in a second axial direction, opposite the first axial direction. The actuating bell may have an axial stop formed on the main body for transmitting the first axial force directly to the sliding sleeve.

17 Claims, 2 Drawing Sheets

CLUTCH ACTUATION DEVICE

CROSS-REFERENCE TO RELATED APPLICATIONS

This application is the United States National Phase of PCT Appln. No. PCT/DE2023/100186 filed Mar. 13, 2023, which claims priority to German Application No. DE102022108835.9 filed Apr. 12, 2022, the entire disclosures of which are incorporated by reference herein.

TECHNICAL FIELD

The present disclosure relates to a clutch actuation device for actuating a clutch for coupling and decoupling an engine to/from a motor vehicle drive train. The clutch actuation device has a sliding sleeve/shift sleeve which is axially displaceable for engaging and disengaging the clutch, and an actuating bell, actuated by the application of pressure from a piston, for axially displacing the sliding sleeve, for example.

BACKGROUND

Such clutch actuation devices, in particular clutch units (DCU, disconnect unit) serving as disconnect clutches, which are actuated by means of a sliding sleeve, are already known from the prior art. There are clutch actuation devices in which the sliding sleeve is axially displaced by means of an (axially and/or radially) flexible actuating bell so as to provide good acoustics and low component loading when the clutch is actuated.

However, the prior art has the disadvantage that a defined high degree of flexibility is necessary or advantageous, especially during engagement, but is rather disadvantageous during disengagement due to the increased travel path of the actuating bell caused by the flexibility and the high load on a spring element providing the flexibility as well as the large axial forces required.

SUMMARY

The present disclosure provides a clutch actuation device which has good properties with respect to acoustics and the loading of components, without having to accept disadvantages with respect to its functionality or the loading of other components. In addition, the disclosed clutch actuation device is relatively simple and cost-effective.

in the present disclosure provides a device of the type in question with an actuating bell having a main body and a spring element which projects from the main body and is of axially elastic configuration. The actuating bell is configured and adapted to the sliding sleeve in such a way that a transmission of an axial force to the sliding sleeve takes place in a first axial direction, i.e. in the direction of tension or in the direction of compression, (axially elastically) via the spring element, and in an opposite, second axial direction, i.e. in the other of the direction of compression or direction of tension, (directly) via the main body. This means that the axially elastic flexibility of the spring element is deactivated/bridged in one axial direction so that the axial force transmission is only formed on one side with a defined flexibility.

Here, due to the unilaterally acting/active flexibility, the axially elastic force transmission only occurs when low axial forces are acting, i.e. during engagement, either in the direction of tension or in the direction of compression, and the axially elastic force transmission is bridged/the force transmission takes place non-elastically/not via the spring element, when greater axial forces act, i.e. during disengagement, in the other direction of the direction of tension or direction of compression. Thus, the flexible force transmission is realized according to requirements.

According to an example embodiment, the actuating bell can have an axial stop formed on the main body, through which stop the axial force in the direction of tension or direction of compression can be transmitted directly, i.e. not via the spring element, to the sliding sleeve. By providing an additional stop, the flexibility of the spring element can be bypassed in a simple manner. This means that the axial stop blocks/prevents the elastic displacement of the spring element in one direction.

According to a further development, the main body can have a compression radial protrusion which forms the axial stop, and against the axial end face of which (facing the sliding sleeve) the sliding sleeve bears for transmitting the axial force in the direction of compression. Furthermore, the spring element can have a tension radial protrusion, against the axial end face of which (facing away from the sliding sleeve) the sliding sleeve bears for transmitting the axial force in the direction of tension. Because the sliding sleeve bears against the axial stop in the direction of compression, the spring element does not have to first travel its elastic travel path before the force is transmitted. At the same time, advantage can be taken of the benefits of flexible force transmission in the direction of tension. In such an arrangement, flexibility is advantageous under tensile load, e.g., when the clutch actuation device actuates the engagement of the clutch in the direction of tension.

According to an alternative development, the main body can have an elasticity bridging protrusion which forms the axial stop and against the axial end face of which the spring element bears (directly) in the first axial direction or in the second axial direction. Owing to the spring element being in the first axial direction or in the second axial direction, the spring element cannot move axially elastically relative to the main body in the corresponding axial direction, so elasticity in the corresponding axial direction, i.e. axially on one side, is deactivated. Because the spring element bears against the axial stop, the spring element does not have to travel its elastic travel path before the force is transmitted. Furthermore, the spring element can have a tension radial protrusion, against the axial end face of which the sliding sleeve bears for transmitting the axial force in the direction of tension, and a compression radial protrusion, against the axial end face of which the sliding sleeve bears for transmitting the axial force in the direction of compression. This is how the coupling with the sliding sleeve is achieved.

According to an alternative development, the main body can have a tension radial protrusion which forms the axial stop, and against the axial end face of which (facing away from the sliding sleeve) the sliding sleeve bears for transmitting the axial force in the direction of tension. Furthermore, the spring element can have a compression radial protrusion, against the axial end face of which (facing the sliding sleeve) the sliding sleeve bears for transmitting the axial force in the direction of compression. Because the sliding sleeve bears against the axial stop in the direction of tension, the spring element does not have to first travel its elastic travel path before the force is transmitted. At the same time, advantage can be taken of the benefits of flexible force transmission in the direction of compression. In such an arrangement, flexibility is advantageous under compression load, e.g., when the clutch actuation device actuates the engagement of the clutch in the direction of compression.

According to an example embodiment, the spring element can be configured as a cantilever arm which is spaced in the axial direction from the main body via a slot/cut-out. The elasticity/stiffness in the axial direction can be specifically adjusted by the design of the slot and thus of the cantilever arm, e.g., by its length. The cantilever arm is therefore separated (mostly but not completely) from the main body by the slot.

According to the embodiment, the tension radial protrusion or the compression radial protrusion of the spring element can be arranged at a free end of the cantilever arm. In other words, the radial protrusion of the spring element, via which the axial force can be transmitted axially elastically to the sliding sleeve, may be arranged at the free end of the cantilever arm, such that axially elastic flexibility during force transmission is achieved on account of the design.

According to the embodiment, the actuating bell can have a connecting portion, configured as a snap closure, for connecting to the sliding sleeve, in which the connecting portion is arranged at a free end of the cantilever arm. Thus, by designing the spring element as a cantilever arm, a radially elastic design of the spring element can be realized so that the actuating bell can be easily mounted on the sliding sleeve via the connecting portion configured as a snap closure. A snap closure serves as a form-fitting connection between two components that can be released by elastic deformation or displacement so that the arrangement of the connecting portion on the cantilever arm and thus its radial-elastic arrangement makes it easy to provide an engagement which engages behind form-fittingly in the axial direction between the sliding sleeve and the actuating bell.

According to an example embodiment, the sliding sleeve can have a radial protrusion, e.g., configured as a circumferential flange, which is arranged axially between the tension radial protrusion and the compression radial protrusion of the actuating bell and/or is encompassed by the snap closure, e.g., with axial play. An arrangement between the tension radial protrusion and the compression radial protrusion (one of which is formed on the axial stop for non-elastic force transmission and one of which is formed on the spring element for elastic force transmission) ensures that the axial force can be transmitted to the radial protrusion of the sliding sleeve (axially form-fittingly). Thus, an axial displacement of the actuating bell can be coupled with the axial displacement of the sliding sleeve.

According to an example embodiment, the actuating bell can be configured substantially as a hollow cylinder, with the spring element being formed by a circumferential portion of the hollow cylinder, which is axially connected at its one end to the main body and at its other end is axially spaced apart from the main body via a through-hole, extending partially in the circumferential direction, in the hollow cylinder. This means that the longitudinal direction of the spring element corresponds to the circumferential direction of the actuating bell. In other words, the spring element is formed on a substantially L-shaped portion of the hollow cylinder, such that the free end of the spring element at the 'end of the long leg' of the L shape can be spring-loaded/displaced by a lever arm up to the 'connection point between the long leg and the short leg' of the L shape. This makes it easy to manufacture the actuating bell with its spring element.

According to an example embodiment, the spring element can have an elongated hole extending in the longitudinal direction of the spring element. This allows the elasticity of the spring element to be adjusted specifically. The elongated hole is thus may be arranged parallel to the slot, i.e. extends in the circumferential direction of the actuating bell.

In other words, the present disclosure relates to a clutch actuation device (DCU, disconnect unit). In the prior art, such clutch actuation devices already use a flexible actuation element in order to achieve good acoustics and low component loading. In this case, a defined high degree of flexibility is not required, particularly during the engagement process and not during the disengagement process. A high degree of flexibility can even have a detrimental effect during the disengagement process since the actuation element must first cover a correspondingly large distance before the disengagement force can be applied and since the disengagement process requires greater forces than the engagement process, so the flexible actuation element, i.e. a spring element of the actuator, is unnecessarily heavily loaded during the disengagement process and must be dimensioned accordingly. Thus, according to the disclosure, it is proposed that the spring element only acts on one side. This means that the spring element is active during the engagement process, in which flexibility is required and only relatively small axial forces act, and is not active during the disengagement process, in which flexibility of the spring element is not required. The one-sided deactivation of the flexibility of the spring element can be realized by stops, for example.

BRIEF DESCRIPTION OF THE DRAWINGS

The present disclosure is explained below with the aid of drawings. In the drawings.

DETAILED DESCRIPTION

Figure 1:
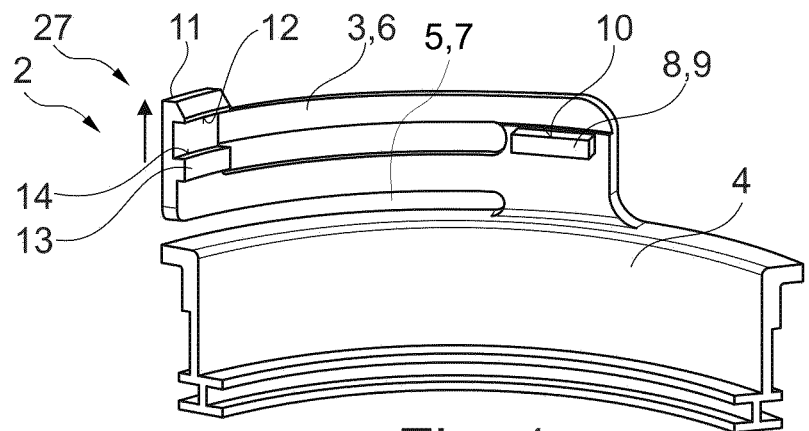
FIG. 1 shows a perspective view of an actuating bell of a clutch actuation device in a first embodiment, in which only a segment of 120° of the actuating bell is shown for better illustration.

The figures are merely schematic in nature and serve solely for understanding the disclosure. Identical elements are provided with the same reference signs. The features of the individual embodiments can be interchanged.

The figures show only certain parts of a clutch actuation device according to the disclosure. The clutch actuation device is used for actuating a clutch for coupling and decoupling an engine to/from a motor vehicle drive train.

The clutch actuation device has a sliding sleeve 1 (see FIG. 5) described in more detail below. The sliding sleeve 1 is axially displaceable for engaging and disengaging the clutch.

In addition, the clutch actuation device has an actuating bell 2 (cf. FIGS. 1 to 4). The actuating bell 2 is used for axially displacing the sliding sleeve 1. FIGS. 1 to 4 show only one segment of the actuating bell 2 (here of 120°), on the basis of which the disclosure is explained.

The actuating bell 2 can be actuated by applying pressure to a piston, i.e. can be displaced axially. In addition, the actuating bell 2 is coupled to the sliding sleeve 1 in the axial direction in order to transmit an axial force to the sliding sleeve 1 during its axial displacement. The actuating bell 2 has a spring element 3 of axially elastic configuration.

The actuating bell 2 is configured substantially as a hollow cylinder. The actuating bell 2 has a main body 4 and the spring element 3 projecting from the main body 4. The spring element 3 is formed by a circumferential portion of the hollow cylinder, which is axially connected to the main body 4 at its one end and at its other end is axially spaced apart from the main body 4 by a through-hole 5, extending partially in the circumferential direction, in the hollow cylinder. Thus, the spring element 3 is configured as a cantilever arm 6 (fixedly connected to the main body 4 on one side) which is spaced apart from the main body 4 in the axial direction via a slot 7 formed by the through-hole 5.

In addition, the spring element 3 can have an elongated hole extending in the longitudinal direction of the spring element 3. The elongated hole may be arranged parallel to the slot 7 or the through-hole 5.

The actuating bell 2 is configured and adapted to the sliding sleeve 1 in such a way that the axial force is transmitted to the sliding sleeve 1 in a first axial direction, i.e. in the direction of tension or in the direction of compression, (axially elastically) via the spring element 3, and in an opposite, second axial direction, i.e. in the direction of compression or direction of tension, (directly) via the main body 4. In other words, the axial force transmission to the sliding sleeve 1 occurs on one side with a defined high degree of flexibility (depending on the design of the spring element 3) and on one side without flexibility.

Figure 2:
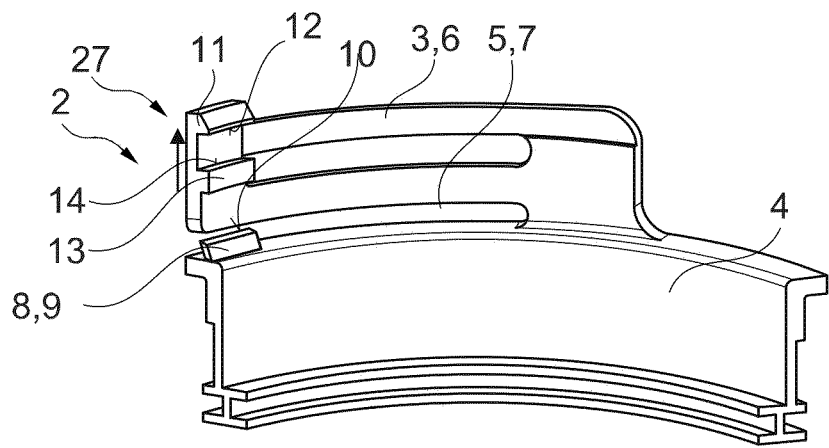
FIG. 2 shows a perspective view of the actuating bell of the clutch actuation device in a second embodiment, in which only a segment of 120° of the actuating bell is shown for better illustration.
Figure 3:
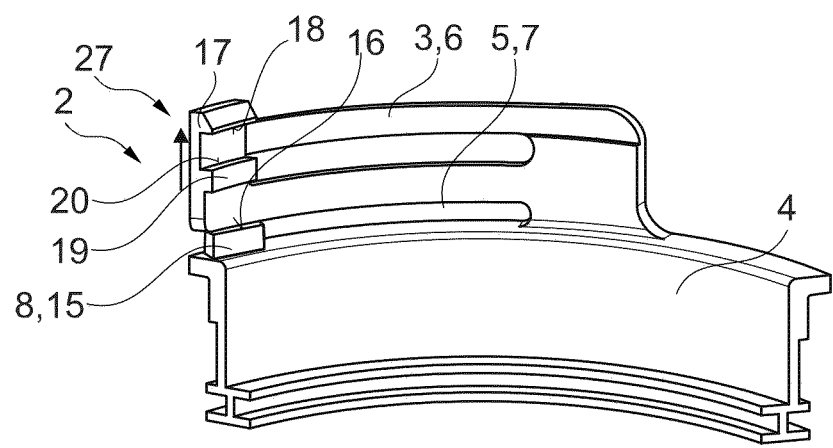
FIG. 3 shows a perspective view of the actuating bell of a clutch actuation device in a third embodiment, in which only a segment of 120° of the actuating bell is shown for better illustration.

The actuating bell 2 can have an axial stop 8 which is formed on the main body and through which the axial force in the direction of tension or the direction of compression can be transmitted directly to the sliding sleeve 1. The axial stop 8 can be configured in various ways. FIGS. 1 to 3 show three different embodiments of the actuating bell 2, which differ only with respect to the arrangement of the axial stop 8 and the resulting force transmission.

In FIGS. 1 and 2, the main body 4 has a compression radial protrusion 9 forming the axial stop 8, against the axial end face 10 of which the sliding sleeve 1 bears for transmitting the axial force in the direction of compression. The axial end face 10 is arranged facing the sliding sleeve 1. In addition, the spring element 3 has a tension radial protrusion 11, against the axial end face 12 of which the sliding sleeve 1 bears for transmitting the axial force in the direction of tension. The axial end face 12 is arranged facing away from the sliding sleeve 1. The tension radial protrusion 11 of the spring element 3 is arranged at a free end of the cantilever arm 6/of the spring element 3. Furthermore, the spring element 3 can optionally have a second compression radial protrusion 13, against the axial end face 14 of which the sliding sleeve 1 also bears in the direction of compression. The second compression radial protrusion 13 of the spring element 3 is arranged at the free end of the cantilever arm 6/of the spring element 3. In FIG. 1, the compression radial protrusion 9 (fixed to the main body) and the second compression radial protrusion 13 (fixed to the spring element) are arranged at the same height in the axial direction. In FIG. 2, the compression radial protrusion 9 (fixed to the main body) and the second compression radial protrusion 13 (fixed to the spring element) are arranged at the same height in the circumferential direction.

In the direction of compression, the sliding sleeve 1 thus bears both against the compression radial protrusion 9, i.e. the axial stop 8, and against the second compression radial protrusion 13, i.e. the spring element 3, and the force transmission takes place (exclusively) via the compression radial protrusion 9, i.e. non-axially elastically, due to the flexibility of the spring element 3. The spring effect of the spring element 3 is therefore only a tensile effect (here upwards).

According to an alternative development, the main body can have an elasticity bridging protrusion which forms the axial stop and against the axial end face of which the spring element bears (directly) in the first axial direction or in the second axial direction.

In FIG. 3, the main body 4 has an elasticity bridging protrusion 15 forming the axial stop 8, against the axial end face 16 of which the spring element 3 bears (directly) in the first axial direction or in the second axial direction, here in the direction of compression. This means that the axial stop 8 fills the slot 5 and prevents elastic displacement of the spring element 3 in the direction of compression so that force transmission in the compression direction takes place via the main body 4, i.e. not axially elastically. The axial end face 16 is arranged facing the spring element 3. The elasticity bridging protrusion 15 can be arranged at the free end of the cantilever arm 6/the spring element 3. In addition, the spring element 3 has a tension radial protrusion 17, against the axial end face 18 of which the sliding sleeve 1 bears for transmitting the axial force in the direction of tension. The axial end face 18 is arranged facing away from the sliding sleeve 1. The tension radial protrusion 17 of the spring element 3 is arranged at a free end of the cantilever arm 6/of the spring element 3. Furthermore, the spring element 3 has a compression radial protrusion 19, against the axial end face 20 of which the sliding sleeve 1 bears in the direction of compression. The compression radial protrusion 19 of the spring element 3 is arranged at the free end of the cantilever arm 6/of the spring element 3.

In the direction of compression, the sliding sleeve 1 thus bears against the compression radial protrusion 19, and the spring element in turn bears against the elasticity bridging protrusion 15, i.e. the axial stop 8, in the direction of compression, so that force transmission takes place in a non-axially elastic manner due to the bridged/deactivated flexibility of the spring element 3 in the direction of compression. The spring effect of the spring element 3 is therefore only a tensile effect (here upwards).

Figure 4:
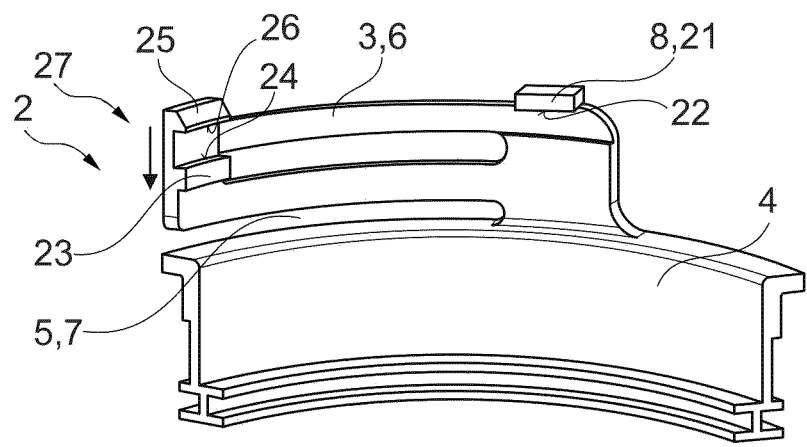
FIG. 4 shows a perspective view of the actuating bell of a clutch actuation device in a fourth embodiment, in which only a segment of 120° of the actuating bell is shown for better illustration.

In FIG. 4, the main body 4 has a tension radial protrusion 21 forming the axial stop 8, against the axial end face 22 of which the sliding sleeve 1 bears for transmitting the axial force in the direction of tension. The axial end face 22 is arranged facing away from the sliding sleeve 1. In addition, the spring element 3 has a compression radial protrusion 23, against the axial end face 24 of which the sliding sleeve 1 bears for transmitting the axial force in the direction of compression. The axial end face 24 is arranged facing away from the sliding sleeve 1. The compression radial protrusion 23 of the spring element 3 is arranged at a free end of the cantilever arm 6/of the spring element 3. Furthermore, the spring element 3 can optionally have a second tension radial protrusion 25, against the axial end face 26 of which the sliding sleeve 1 also bears in the direction of tension. The second tension radial protrusion 25 of the spring element 3 is arranged at the free end of the cantilever arm 6/of the spring element 3. The tension radial protrusion 21 (fixed to the main body) and the second tension radial protrusion 25 (fixed to the spring element) are arranged at the same height in the axial direction.

In the direction of tension, the sliding sleeve 1 thus bears both against the tension radial protrusion 21, i.e. the axial stop 8, and against the second tension radial protrusion 25, i.e. the spring element 3, and force transmission takes place (exclusively) via the tension radial protrusion 21, i.e. non-axially elastically, due to the flexibility of the spring element 3. The spring effect of the spring element 3 is therefore only a compressive effect (here downwards).

Furthermore, the actuating bell 2 has a connecting portion 27 configured as a snap closure for connecting to the sliding sleeve 1. The connecting portion 27 is arranged at the free end of the cantilever arm 6. In the embodiment shown in FIGS. 1 and 2, the connecting portion 27 is formed by the tension radial protrusion 11 of the spring element 3 (and the second compression radial protrusion 13 of the spring element 3). The tension radial protrusion 11 of the spring element 3 is configured as a snap hook. In the embodiment shown in FIG. 3, the connecting portion 27 is formed by the tension radial protrusion 17 of the spring element 3 (and the second compression radial protrusion 19 of the spring element 3). The tension radial protrusion 17 of the spring element 3 is configured as a snap hook. In the embodiment shown in FIG. 4, the connecting portion 27 is formed by the second tension radial protrusion 25 of the spring element 3 (and the compression radial protrusion 23 of the spring element 3). The second tension radial protrusion 25 of the spring element 3 is configured as a snap hook.

Owing to its design as a cantilever arm 6, the spring element 3 is configured to be radially elastic, e.g., elastically displaceable radially outward. Thus, the snap hook can be brought into axially form-fitting engagement with the sliding sleeve 1.

Figure 5:
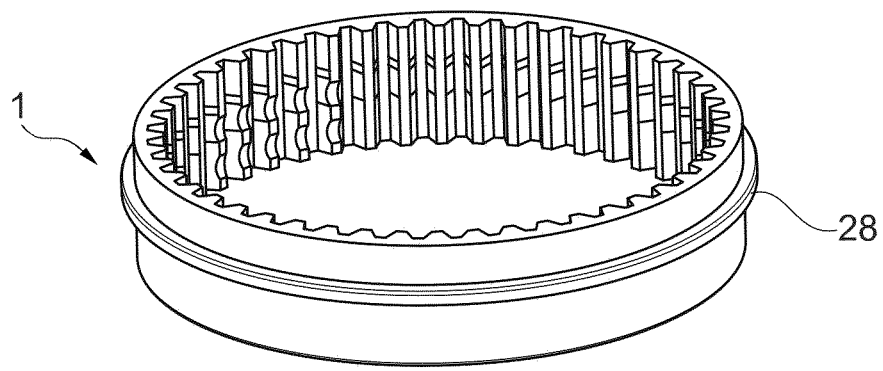
FIG. 5 shows a perspective view of a sliding sleeve of the clutch actuation device.

FIG. 5 shows the sliding sleeve 1. The sliding sleeve 1 is configured substantially as a hollow cylinder. The sliding sleeve 1 has a radial protrusion 28. The radial protrusion 28 is configured as a circumferential, outwardly projecting flange. The radial protrusion 28 is arranged axially between the (force-transmitting) tension radial protrusion 11, 17, 21 and the (force-transmitting) compression radial protrusion 9, 19, 23 of the actuating bell 2. In addition, the radial protrusion 28 is encompassed by the snap closure/connecting portion 27.

The sliding sleeve 1 has a tooth system in the form of axial grooves on its inner diameter, via which torque can be transmitted between clutch components of the clutch.

REFERENCE NUMERALS

1 Sliding sleeve
2 Actuating bell
3 Main body
4 Spring element
5 Through-hole
6 Cantilever arm
7 Slot
8 Axial stop
9 Compression radial protrusion
10 Axial end face of the compression radial protrusion
11 Tension radial protrusion
12 Axial end face of the tension radial protrusion
13 Second compression radial protrusion
14 Axial end face of the second compression radial protrusion
15 Compression radial protrusion
16 Axial end face of the compression radial protrusion
17 Tension radial protrusion
18 Axial end face of the tension radial protrusion
19 Second compression radial protrusion
20 Axial end face of the second compression radial protrusion
21 Tension radial protrusion
22 Axial end face of the tension radial protrusion
23 Compression radial protrusion
24 Axial end face of the second compression radial protrusion
25 Second tension radial protrusion
26 Axial end face of the second tension radial protrusion
27 Connecting portion
28 Radial protrusion

The invention claimed is:

1. A clutch actuation device for actuating a clutch for coupling and decoupling an engine from a motor vehicle drive train, having a sliding sleeve which is axially displaceable for engaging and disengaging the clutch, and an actuating bell for axially displacing the sliding sleeve, wherein the actuating bell has a main body and a an elastic spring element, of axially elastic configuration, projecting from the main body, and the actuating bell is configured and adapted to the sliding sleeve in such a way that a transmission of an axial force to the sliding sleeve takes place in a first axial direction via the spring element and in an opposite, second axial direction via the main body, wherein the actuating bell has an axial stop which is formed on the main body and through which the axial force can be transmitted directly in the direction of tension or in the direction of compression to the sliding sleeve.

2. The clutch actuation device according to claim 1, wherein the main body has a compression radial protrusion which forms the axial stop and against the axial end face of which the sliding sleeve bears for transmitting the axial force in the direction of compression, and the spring element has a tension radial protrusion, against the axial end face of which the sliding sleeve bears for transmitting the axial force in the direction of tension.

3. The clutch actuation device according to claim 1, wherein the main body has an elasticity bridging protrusion which forms the axial stop and against the axial end face of which the spring element bears in the first axial direction or in the second axial direction, and the spring element has a tension radial protrusion, against the axial end face of which the sliding sleeve bears for transmitting the axial force in the direction of tension, and a compression radial protrusion, against the axial end face of which the sliding sleeve bears for transmitting the axial force in the direction of compression.

4. The clutch actuation device according to claim 1, wherein the main body has a tension radial protrusion which forms the axial stop and against the axial end face of which the sliding sleeve bears for transmitting the axial force in the direction of tension, and the spring element has a compression radial protrusion, against the axial end face of which the sliding sleeve bears for transmitting the axial force in the direction of compression.

5. The clutch actuation device according to claim 1, wherein the spring element is configured as a cantilever arm which is spaced in the axial direction from the main body via a slot.

6. The clutch actuation device according to claim 5, wherein the actuating bell has a connecting portion configured as a snap closure for connecting to the sliding sleeve, wherein the connecting portion is arranged at a free end of the cantilever arm.

7. The clutch actuation device according to claim 6, wherein the sliding sleeve has a radial protrusion is encompassed by the connecting portion.

8. The clutch actuation device according to claim 1, wherein the actuating bell is configured substantially as a hollow cylinder, wherein the spring element is formed by a circumferential portion of the hollow cylinder which is axially connected at one end thereof to the main body and is axially spaced at the other end thereof from the main body via a through-hole extending partially in the circumferential direction in the hollow cylinder.

9. A clutch actuation device comprising:
   a sliding sleeve, axially displaceable for engaging and disengaging a clutch; and
   an actuating bell for axially displacing the sliding sleeve, the actuating bell comprising:
      a main body arranged for transmitting a first axial force to the sliding sleeve in a first axial direction;
      an axial stop formed on the main body for transmitting the first axial force directly to the sliding sleeve; and
      an elastic spring element projecting from the main body, the elastic spring element arranged for transmitting a second axial force to the sliding sleeve in a second axial direction, opposite the first axial direction.

10. The clutch actuation device of claim 9, wherein:
    the main body comprises a compression radial protrusion that forms the axial stop, the compression radial protrusion comprising a compression radial protrusion axial end face for transmitting the first axial force to the sliding sleeve in the first axial direction; and
    the elastic spring element comprises a tension radial protrusion, the tension radial protrusion comprising a tension radial protrusion axial end face for transmitting the second axial force to the sliding sleeve in the second axial direction.

11. The clutch actuation device of claim 9, wherein:
    the main body comprises an elasticity bridging protrusion that forms the axial stop, the elastically bridging protrusion comprising a bridging protrusion end face;
    the elastic spring element bears against the bridging protrusion end face in the first axial direction;
    the elastic spring element comprises a compression radial protrusion and a tension radial protrusion;
    the compression radial protrusion comprises a compression radial protrusion end face for transmitting the first axial force to the sliding sleeve in the first axial direction; and
    the tension radial protrusion comprises a tension radial protrusion end face for transmitting the second axial force to the sliding sleeve in the second axial direction.

12. The clutch actuation device of claim 9, wherein:
    the main body comprises a tension radial protrusion that forms the axial stop, the tension radial protrusion comprising a tension radial protrusion end face for transmitting the first axial force to the sliding sleeve in the first axial direction; and
    the elastic spring element comprises a compression radial protrusion, the compression radial protrusion comprising a compression radial protrusion end face for transmitting the second axial force to the sliding sleeve in the second axial direction.

13. The clutch actuation device of claim 9, wherein the elastic spring element is a cantilever arm spaced axially away from the main body by a slot.

14. The clutch actuation device of claim 13, wherein:
    the actuating bell further comprises a connecting portion arranged as a snap closure at a free end of the cantilever arm; and
    the sliding sleeve comprises a radial protrusion encompassed by the connecting portion.

15. The clutch actuation device of claim 9, wherein:
    the actuation bell is configured substantially as a hollow cylinder; and
    the elastic spring element is formed by a circumferential portion of the hollow cylinder, the elastic spring element comprising a first end axially connected to the main body and a second end axially spaced from the main body by a through hole extending partially in a circumferential direction of the hollow cylinder.

16. A clutch actuation device comprising:
    an actuating bell comprising:
       a main body arranged for transmitting a first axial force to the sliding sleeve in a first axial direction; and
       a cantilever arm projecting from the main body and spaced axially away from the main body by a slot, the cantilever arm arranged for transmitting a second axial force to the sliding sleeve in a second axial direction, opposite the first axial direction; and
       a connecting portion arranged as a snap closure at a free end of the cantilever arm; and
    a sliding sleeve, axially displaceable by the actuating bell for engaging and disengaging a clutch, the sliding sleeve comprising a radial protrusion encompassed by the connecting portion.

17. The clutch actuation device of claim 16, wherein:
    the actuation bell is configured substantially as a hollow cylinder; and
    the cantilever arm is formed by a circumferential portion of the hollow cylinder, the cantilever arm comprising a first end axially connected to the main body and a second end axially spaced from the main body by a through hole extending partially in a circumferential direction of the hollow cylinder.

* * * * *